2,980,609
CLARIFICATION OF INDUSTRIAL WATERS

Ronald R. House, Darien, and Sewell T. Moore, Stamford, Conn., assignors to American Cyanamid Company, New York, N.Y., a corporation of Maine No Drawing. Filed June 22, 1953, Ser. No. 363,392

7 Claims. (Cl. 210—54)

This invention relates to the treatment of industrial process waters containing suspended organic impurities and more particularly to the coagulation of such supended impurities.

A wide variety of industrial waters contain finely divided, suspended impurities of an organic nature. Typical of these are pulp and paper mill effluents, which contain finely divided cellulosic paper fibers, effluents from cotton textile mills, effluent from hardboard manufacture, and the like. The principles of our present invention are applicable to the treatment of all such process waters as well as to water containing suspended sewage solids as in sewage disposal plants and the like.

In its broadest aspects, our invention is directed to a procedure for coagulating the suspended organic impurities in the above and other industrial process waters by adding thereto small quantities of the hereinafter defined hydrophilic aminoaliphatic resin and maintaining the water in a suitably non-acid condition for a sufficient length of time for the coagulation to take place. An additional feature of the invention, however, may consist in the recovery of coagulated impurities, if desired, by acidification of the coagulate after it has been separated from the water.

We have discovered that suspended organic impurities of the type of cellulosic fibers, sewage solids and the like can be coagulated by the action of small quantities of hydrophilic aminoaliphatic linear chain polymer resins at pH values of about 7.0 and higher, and that this coagulation is entirely independent of the amount of water present. In other words, the coagulation is equally effective at relatively high concentrations of suspended solids in the water, and in very dilute suspensions. The quantity of coagulating agent to be used is therefore based on the quantity of suspended solids and the pH values to be maintained during coagulation, and the total amount of water present need not be considered.

The aminoaliphatic chain polymer resins which are applied in practicing the process of our invention are characterized by the presence of amine groups attached directly to the carbon atoms of a substantially saturated carbon chain. The amine groups are usually present as aminoethylene radicals that form part of the polymer chain, and the polymer may consist entirely of such aminoethylene radicals or may contain these radicals interposed between or among other linear copolymerization agents.

The aminoaliphatic chain polymer resins used in practicing our invention are prepared from linear aliphatic chain polymers wherein carboxylic acid amide groups are attached to carbon atoms of the polymer-forming chain. A number of polymers and copolymers of this type are well known, and may be used as raw materials. However, the preferred materials are polyacrylamide, polymers of lower alkyl-substituted acrylamides such as polymethacrylamide and polyethylacrylamide and copolymers of these acrylamides with acrylonitrile, styrenes, vinyl esters and ethers, acrylic acid esters and other non-acid copolymerization agents. Examples of the monomeric compounds which may be polymerized with the acrylamides and employed are such as styrene per se, nuclear substituted alkyl styrene, e.g., o-, m-, and p-methylstyrene, 2,4-dimethyl styrene and the like, nuclear substituted halo styrene, e.g., 2,4-dichlorostyrene, 2,5-dichlorostyrene and the like, side chain alkyl and halo substituted styrenes, e.g., alpha chlorostyrene, alpha methylstyrene and the like, vinyl acetate, vinyl propionate and the like, methyl vinyl ether, methyl isopropenyl ether, propyl vinyl ether, butyl vinyl ether and the like, ethyl acrylate, ethyl methacrylate, butyl acrylate and the like. These polymers and copolymers are well known and correspond substantially to the formula

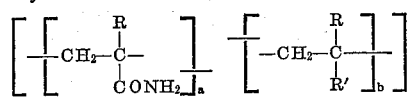

in which R is hydrogen or a methyl or ethyl radical and R' is a non-acid polymer chain substituent such as a phenyl or alkyl phenyl radical (as in the styrenes and alkylstyrenes), a nitrile radical, and acetoxy radical or a —COOM radical, M being a lower alkyl radical preferably of from 1 to 4 carbon atoms, and $a$ and $b$ represent the respective molar proportions of carboxylic acid amide groups and vinyl type copolymer in the composition. In order to ensure a sufficient number or proportion of carboxylic acid amide groups in the starting materials it is preferred that the ratio of $a$ to $b$ should be at least 1 to 5. In other words, where copolymers are used they should contain at least 20 mol percent of the material containing the carboxylic acid amide groups. From this minimum, however, the proportion of acrylamides in the polymer may extend to as much as 100% if desired; i.e., the polyacrylamides themselves may be the starting materials. In this case, of course, $b$ in the above formula equal zero.

The above-described starting materials are known to exist in the form of both low polymers and relatively high polymers, and either form may be used in practicing our invention. It is known, for example, that polyacrylamides of controlled molecular weights can be obtained by polymerizing acrylamide in water containing approximately 5 to 40% by volume of a water-miscible alcohol such as ethanol or isopropanol; by this procedure polymers having molecular weights as low as 2,000 or as high as 300,000 can be prepared. Similar procedures may be used in preparing the copolymers described above, and the resulting molecular weights of the products are comparable; i.e., they range from about 2,000 to about 40,000 in the low polymers and from 50,000 to 500,000 or more in the higher polymers. As will subsequently be illustrated, polymers and copolymers of either class may be used with the formation of the corresponding aminoaliphatic chain polymers.

The aminoaliphatic resins which we use are produced by converting carboxylic acid amide groups of linear carbon chain polymers of the above types into amine groups by the action of alkali metal hypohalites in aqueous alkaline solution. This conversion of amide groups into amine groups is known as the Hofmann degradation. It has long been applied to substantially non-polymerized compounds but has only recently been used successfully for the treatment of aliphatic chain polymers of the type under consideration. By employing the reaction conditions hereinafter described, however, a large proportion of the amide groups of polyacrylamides and non-acid acrylamide copolymers are converted into amine groups with the formation of the desired resinous products.

Although the conversion of amide groups of linear chain polymers and copolymers into amine groups by the Hofmann reaction can be carried to substantial completion under the most favorable operating conditions, it is not ordinarily advisable so to convert more than about 80% of the amide groups. In most cases a conversion of about 60% of the amide groups is sufficient, and the conversion may be as little as 20–25% if desired. The most important products used in practicing our invention are therefore linear carbon chain polymers which contain residual carboxylic acid amide groups in addition to amine groups attached to the carbon chain, and which of course may also contain other substituent groups of the type described above. The reaction products of the polyacrylamides themselves correspond substantially to the formula

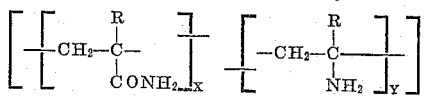

in which R is as defined above and the ratio of X to Y is from 1:4 to 4:1. Similarly, the conversion products of the copolymers correspond substantially to the formula

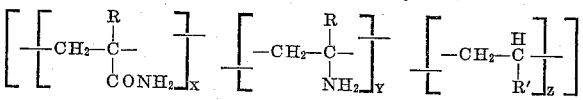

in which R and R' are as defined above, the ratio of X to Y is from 1:4 to 4:1 and the ratio of $X+Y$ to Z is at least 1 to 5.

A review of the compositions described above shows that all of these products are linear aliphatic carbon chain compounds containing recurring aminoethylene groups as an element or link in the chain, these aminoethylene groups corresponding to the formula

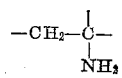

there being from 0.2 to about 4 such aminoethylene groups for each 10 linear chain carbon atoms. When all of the ingredients of the polymer or copolymer are vinyl type compounds, the polymer chain is composed of recurring ethylenic units including the aminoethylene groups of this formula. When the polyacrylamides are used as starting materials, the polymer chain is composed substantially entirely of amidoethylene units and aminoethylene units in the ratios described above.

In the production of the aminoaliphatic chain polymer resins, linear aliphatic chain polymers and copolymers wherein carboxylic acid amide groups are attached to carbon atoms of the polymer-forming chain as previously described are reacted with an alkaline hypohalite within the temperature range of about 0° to 40° C. In carrying out the reaction, an alkali metal hydroxide is admixed with an alkali metal hypohalite such as a compound of chlorine, bromine or iodine and the mixture brought to reaction temperature. The desired amount of the linear aliphatic chain polymer or copolymer is then introduced into the solution and the reaction carried out for a period of about 15 minutes to about 1 to 2 hours with stirring while maintaining the temperature within the range of from about 0° C. to about 40° C. While it is possible to use the hypohalite solution per se, it is also possible to form the hypohalite solution in situ. The formation of the hypohalite in situ is easily accomplished by adding the halogen to the alkali metal hydroxide.

The amounts of the reactants that are present should be carefully controlled to yield the desired products. The amount of the linear aliphatic chain polymer or copolymer that is present is calculated by the number of recurring mer-mols of carboxylic acid amide groups present in said polymer or copolymer. When the hypohalite is produced in situ, the amount of chlorine, bromine or iodine that is added to the reaction mixture is calculated as the mols of alkali metal hypohalite formed. The mol ratio of said polymer or copolymer as above calculated, alkali metal hydroxide, and halogen or the alkali metal hypohalites thereof, will be present in an amount varying from about 1:1.6:0.8, respectively, to about 1:4:2, respectively. It is preferred, however, that the molar ratio be within the range of from about 1:3.5:1.1, respectively, to about 1:3.7:1.3, respectively.

The reaction product is preferably separated from the alkaline reaction mixture by neutralizing the solution with an acid. Suitable acids that may be used to neutralize the solution are such as hydrochloric, sulfuric, phosphoric, etc. During the addition of the acid to the mixture, carbon dioxide is evolved. After the reaction product has been separated it may be hardened by soaking in a water-soluble organic solvent such as, for example, methanol, ethanol, propanol, acetone, dioxane, etc. Inasmuch as the reaction product is water-soluble, it is necessary to maintain an excess amount of said solvent when a water-solvent mixture is used.

The preparation of typical resins is outlined in the following table, wherein the quantities of reagents represent grams. The hypobromite solutions were prepared by cooling a solution of the required amount of sodium hydroxide to 0°–5° C. and adding the bromine while maintaining the temperature below 5° C. The hypochlorite solutions were made by dissolving the sodium hydroxide in a 5.25% solution of sodium hypochlorite while cooling. A 20% excess of hypohalite was usually used and the molar ratio of sodium hydroxide to hypohalite was usually 3 to 1. The hydrochloric acid was added to terminate the Hofmann reaction and precipitate the resin, after which the supernatant liquid was removed and the products soaked in a 60:40 methanol-water mixture and then dried for 2 hours at 65–70° C.

| Resin No. | 10% Polyacrylamide | | 97.7% NaOH | 5.25% NaOCl | Bromine | Water | 37.3% HCl | Temp., °C. | Time, Min. |
|---|---|---|---|---|---|---|---|---|---|
| | Wt. | Viscosity, cp. | | | | | | | |
| 1 | 71 | 32,000 | 24.7 | | 19.2 | 200 | 29.2 | 45–50 | 6 |
| 2 | 71 | 32,000 | 24.6 | | 19.2 | 140 | 29.2 | 25–35 | 39 |
| 3 | 142 | 32,000 | 49.2 | | 38.4 | 600 | 58.4 | 25–27 | 60 |
| 4 | 142 | 36,700 | 29.4 | 344 | | 314 | 59.2 | 25–28 | 60 |
| 5 | 142 | 36,700 | 16.3 | 287 | | 300 | 28.4 | 25–29 | 40 |
| 6 | 71 | 36,700 | 14.7 | 172 | | | 29.6 | 25–27 | 35 |
| 7 | 142 | 14,000 | 29.4 | 341 | | 317 | 59.2 | 25–29 | 60 |
| 8 | 142 | 5,000 | 29.4 | 341 | | 317 | 59.2 | 25–29 | 60 |
| 9 | 142 | 874 | 29.4 | 341 | | 317 | 59.2 | 25–29 | 60 |

The above and other similar resins of the aminoaliphatic linear chain polymer type are added to industrial water to be clarified in the form of aqueous dispersions; usually as colloidal aqueous solutions thereof. These resins are most easily dissolved by suspending them in hot water, preferably with the addition of a small amount of acid or alkali, and agitating the suspension until a colloidal solution is obtained. In most cases the resin solution should be prepared shortly before it is used, since we have found that the best results are obtained with freshly prepared solutions. If the water undergoing treatment is neutral or alkaline the desired coagulation takes place simply upon standing; however, if the water is acid it should be made neutral or preferably alkaline by the addition of a suitable water-soluble alkali such as sodium hydroxide, sodium carbonate, sodium hexametaphosphate or the like.

The quantity of hydrophilic aminoaliphatic linear chain polymer resin to be added should be within the range of 0.25% to 3% based on the dry weight of the organic impurities in the water that are to be coagulated. Within this range, the exact quantity will depend on the alkalinity of the system, or, more precisely, the exact pH of the water during the coagulation should be adjusted in accordance with the amount of resin used. Ordinarily the preferred pH range for the water is between 7.0 and about 11.5, and its alkalinity within this range should be proportionately greater as the ratio of aminoaliphatic polymer resin to organic impurities in the water is decreased. Thus for example, when about 1.5% of the resin was added to water containing about 200 parts per million of fibers of bleached kraft paper pulp, coagulation of the fibers was obtained after the pH of the water had been adjusted to 7.5. When 3% of the resin was added to another sample of the same water, coagulation occurred at a pH of 7.0. When quantities of 0.25% to 0.5% were added to other samples of the same water, coagulation was noticeable at pH values of 10.0 and higher, but the most effective coagulation took place at a pH of 11.0. However, our experiments have shown that coagulation can be obtained at pH values of 8.5 to 9 and higher with any desired quantity of resin within the above-described range of 0.25–3%.

After the coagulation or flocculation of the suspended impurities has taken place to the desired extent, the floc may be separated by any suitable procedure. Thus, for example, the coagulation may be carried out in a clarifier of the Dorr thickener type from which the clarified water is withdrawn through an overflow launder while the thickened pulp is removed from the bottom and passed to a rotary vacuum filter. In many cases, however, filtration may be unnecessary. Thus, in clarifying paper mill white water as in a saveall the coagulated fibers can be withdrawn as a concentrated aqueous suspension or pulp and treated by the addition of sufficient acid to reduce the pH well below 7.0. This will result in a deflocculation, or reversal of the coagulation or flocculation, and the resulting suspension of fibers can be returned to the papermaking system.

It is evident, therefore, that our invention provides a method of reversibly coagulating suspended organic impurities in water whereby the suspended impurities may be first coagulated and settled or filtered off and, if desired, may then be redispersed in water simply by acidifying them with sulfuric acid, hydrochloric acid or other suitable acid to a pH well below 7.0 and preferably within the range of about 5 to 6. The coagulation is obtained simply by adding to the contaminated water a small quantity of the hydrophilic aminoaliphatic resin hereinbefore described with concomitant or subsequent adjustment of the pH of the water to a value of 7.0 or higher. The coagulated impurities may then be separated by gravity, or on a clarification filter, and if the separated impurities are of sufficient value they can be readily deflocculated for reuse by simple acidification.

What we claim is:

1. A method of coagulating suspended solid organic impurities in water which comprises adding to said water an aqueous dispersion of a hydrophilic aminoaliphatic linear having a molecular weight of at least 2,000 and carbon-to-carbon chain polymer resin having a molecular weight of at least 2,000 and having free amine groups attached directly to the polymer chain thereof, the quantity of added resin being within the range of 0.25% to 3% based on the dry weight of said organic impurities, maintaining the water in a non-acid condition until coagulation of said impurities has occurred and separating the coagulated impurities from the water.

2. A method according to claim 1 wherein the pH of the water during the coagulation is between 7.0 and about 11.5, its alkalinity within this range being proportionately greater as the ratio of aminoaliphatic polymer resin to organic impurities in the water is decreased.

3. A method according to claim 2 wherein the polymer chair of the aminoaliphatic polymer resin is composed of recurring ethylenic units and includes from 0.2 to 4 aminoethylene groups for each 10 linear chain carbon atoms.

4. A method of coagulating suspended solid impurities in water which comprises adding to said water an aqueous dispersion of a hydrophilic aminoaliphatic vinyl type polymer resin having a molecular weight of at least 2,000 and having a carbon-to-carbon polymer chain composed of recurring ethylenic units including both amidoethylene units and free aminoethylene units in the ratio of from 1 to 4 to 4 to 1, said chain containing from 0.2 to 4 such aminoethylene units for each 10 carbon atoms thereof, the quantity of added resin being within the range of 0.25% to 3% based on the dry weight of said organic impurities, maintaining the water so treated in a non-acid condition until coagulation has occurred and separating the coagulated impurities from the water.

5. A method according to claim 4 wherein the pH of the water during the coagulation is between 7.0 and about 11.5, its alkalinity within this range being proportionately greater as the ratio of aminoaliphatic polymer resin to organic impurities in the water is decreased.

6. A method according to claim 5 wherein the vinyl type polymer resin corresponds substantially to the formula

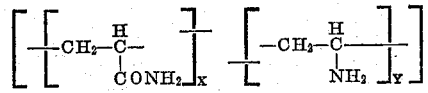

wherein the ratio of X to Y is from 1 to 4 to 4 to 1.

7. A method of treating water containing suspended solid organic impurities which comprises adding to said water an aqueous dispersion of a hydrophilic aminoaliphatic carbon-to-carbon chain polymer resin having a molecular weight of at least 2,000 and having free amine groups attached directly to the polymer chain, the quantity of added resin being within the range of 0.25% to 3% based on the dry weight of said organic impurities, maintaining the water at a pH, which is within the range of 7.0 to 11.5 said pH being proportionately greater as the ratio of aminoaliphatic polymer resin to organic impurities in the water is decreased, until coagulation of said impurities has occurred, separating the coagulated impurities from the water, and deflocculating the separated impurities by acidifying them to a pH below 7.0.

References Cited in the file of this patent

UNITED STATES PATENTS

| | | |
|---|---|---|
| 1,976,679 | Fikentscher et al. | Oct. 9, 1934 |
| 2,104,728 | Bertsch et al. | Jan. 11, 1938 |
| 2,327,302 | Dittmar | Aug. 17, 1943 |
| 2,347,576 | Ogilby | Apr. 25, 1944 |
| 2,394,083 | Lintz | Feb. 5, 1946 |
| 2,403,143 | Tutt | July 2, 1946 |
| 2,563,897 | Wilson et al. | Aug. 14, 1951 |
| 2,601,597 | Daniel et al. | June 24, 1952 |
| 2,601,598 | Daniel et al. | June 24, 1952 |
| 2,625,529 | Hedrick et al. | Jan. 13, 1953 |
| 2,668,111 | Lindquist | Feb. 2, 1954 |
| 2,694,702 | Jones | Nov. 16, 1954 |

FOREIGN PATENTS

| | | |
|---|---|---|
| 154,799 | Australia | Apr. 26, 1951 |
| 163,501 | Australia | June 22, 1955 |
| 163,502 | Australia | June 22, 1955 |

OTHER REFERENCES

Ruehrwein et al.: Soil Science, vol. 73, No. 6, June 1952, pages 419 and 485–92.

Arcus: J. Polymer Sci., vol. VIII, No. 4, pages 365–70, 1952.

UNITED STATES PATENT OFFICE
CERTIFICATE OF CORRECTION

Patent No. 2,980,609                                  April 18, 1961

Ronald R. House et al.

It is hereby certified that error appears in the above numbered patent requiring correction and that the said Letters Patent should read as corrected below.

Column 5, line 64, strike out "having a molecular weight of at least 2,000 and --; column 6, line 4, for "chair" read -- chain --; line 7, after "solid" insert -- organic --.

Signed and sealed this 17th day of October 1961.

(SEAL)
Attest:

ERNEST W. SWIDER                                         DAVID L. LADD
Attesting Officer                                             Commissioner of Patents

USCOMM-DC